(12) United States Patent
Shimizu

(10) Patent No.: US 12,017,729 B2
(45) Date of Patent: Jun. 25, 2024

(54) DRIVE UNIT AND ELECTRICALLY ASSISTED BICYCLE

(71) Applicant: YAMAHA HATSUDOKI KABUSHIKI KAISHA, Iwata (JP)

(72) Inventor: Tatsunori Shimizu, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 726 days.

(21) Appl. No.: 17/065,569

(22) Filed: Oct. 8, 2020

(65) Prior Publication Data
US 2021/0107592 A1 Apr. 15, 2021

(30) Foreign Application Priority Data

Oct. 11, 2019 (JP) ................................ 2019-187527

(51) Int. Cl.
| | |
|---|---|
| *B62M 6/55* | (2010.01) |
| *B62M 3/00* | (2006.01) |
| *B62M 23/02* | (2010.01) |
| *F16C 9/02* | (2006.01) |
| *F16C 25/06* | (2006.01) |

(52) U.S. Cl.
CPC ................ *B62M 6/55* (2013.01); *B62M 3/00* (2013.01); *B62M 23/02* (2013.01); *F16C 9/02* (2013.01); *F16C 25/06* (2013.01); *F16C 2326/28* (2013.01)

(58) Field of Classification Search
CPC .......... B62M 6/55; B62M 3/00; B62M 3/003; B62M 23/02; F16C 9/02; F16C 25/083; F16C 25/06; F16C 2326/28; F16C 35/067; F16C 35/07; F16C 35/077
See application file for complete search history.

(56) References Cited

U.S. PATENT DOCUMENTS 4,606,658 A * 8/1986 Hofmann ............... F16C 33/416
384/510
5,829,546 A 11/1998 Tseng
(Continued)

FOREIGN PATENT DOCUMENTS

| CN | 104773254 A | 7/2015 |
|---|---|---|
| CN | 109665051 A | 4/2019 |

(Continued)

OTHER PUBLICATIONS

Shou Long Precision Industrial Co., Ltd., "Bowed Retaining Rings (Internal)," ANSI/ASME B 18.27.3, Datasheet [online], 2023. Retrieved from the Internet: <URL:https://www.shoulong.com.tw/en/product/retaining-rings-for-bores_1014-BHO.html>, 1 page.

*Primary Examiner* — Anne Marie M Boehler
(74) *Attorney, Agent, or Firm* — Keating & Bennett, LLP

(57) ABSTRACT

A drive unit of an electrically assisted bicycle includes a movement restrictor to restrict the movement of a first bearing relative to a housing along a thrust direction. A first end surface of the first bearing is farther outward than a second end surface along the right-left direction. The housing includes an abutting portion that abuts the first end surface of the first bearing, and a groove that is farther inward than the abutting portion along the right-left direction. The movement restrictor includes the abutting portion, the groove of the housing, and an elastic member fitted in the groove.

10 Claims, 11 Drawing Sheets

(56) References Cited

U.S. PATENT DOCUMENTS

| | | | |
|---|---|---|---|
| 6,848,831 B2 * | 2/2005 | Shimizu | H02K 5/1732 |
| | | | 384/517 |
| 8,590,421 B2 * | 11/2013 | Meggiolan | B62K 19/34 |
| | | | 74/594.1 |
| 9,387,905 B2 * | 7/2016 | Chonan | B62M 3/003 |
| 2002/0166708 A1 * | 11/2002 | Tseng | B62M 6/55 |
| | | | 180/206.2 |
| 2015/0020621 A1 * | 1/2015 | Kawakami | B62M 6/60 |
| | | | 74/47 |
| 2019/0047659 A1 | 2/2019 | Usami | |
| 2019/0367127 A1 | 12/2019 | Noda et al. | |
| 2021/0039744 A1 * | 2/2021 | Cheng | B62M 6/50 |
| 2021/0071722 A1 * | 3/2021 | Sato | F16C 35/077 |
| 2022/0163063 A1 | 5/2022 | Rossberger | |

FOREIGN PATENT DOCUMENTS

| | | |
|---|---|---|
| DE | 102016114845 A1 | 2/2018 |
| DE | 10 2016 122 845 A1 | 5/2018 |
| DE | 102019207817 A1 | 12/2019 |
| JP | 59-1694 U | 1/1984 |
| JP | 02-88444 U | 7/1990 |
| JP | 09-142370 A | 6/1997 |
| JP | 3081960 U | 11/2001 |
| JP | 2008-196644 A | 8/2008 |
| JP | 2010-038254 A | 2/2010 |
| JP | 2014-196080 A | 10/2014 |
| JP | 2016-109232 A | 6/2016 |
| JP | 2019-031257 A | 2/2019 |

* cited by examiner

DRIVE UNIT AND ELECTRICALLY ASSISTED BICYCLE

CROSS REFERENCE TO RELATED APPLICATIONS

This application claims the benefit of priority to Japanese Patent Application No. 2019-187527 filed on Oct. 11, 2019. The entire contents of this application are hereby incorporated herein by reference.

BACKGROUND OF THE INVENTION

1. Field of the Invention

The present invention relates to a drive unit mountable to a body frame of an electrically assisted bicycle. The present invention also relates to an electrically assisted bicycle including such a drive unit.

2. Description of the Related Art

Bicycles are widely prevalent as casual means of transportation, regardless of age and gender. In recent years, electrically assisted bicycles in which a driving power from an electric motor is utilized to assist the pedaling force of a rider have become more and more prevalent. Electrically assisted bicycles are disclosed in Japanese Laid-Open Patent Publication No. 2014-196080, for example.

An electrically assisted bicycle has a drive unit including an electric motor and the like. One known type of drive unit is a type which is disposed within the hub of the rear wheel, and another is a type which is mounted at the lower end of the body frame (near the bottom bracket). The latter type of drive unit has become predominant in the recent years.

The electrically assisted bicycle disclosed in Japanese Laid-Open Patent Publication No. 2014-196080 includes a drive unit which is mounted at the lower end of the body frame. This drive unit includes a housing, an electric motor, a pedal crank shaft, and the like.

The electric motor, which is accommodated in the housing, generates a driving power that is utilized to assist the pedaling force of a rider. The pedal crank shaft extends through the housing along the vehicle's right-left direction. Via arms, pedals are mounted to the pedal crank shaft. Within the housing, the pedal crank shaft is rotatably supported by a pair of bearings. Rotation of the pedal crank shaft is transmitted to the rear wheel via a drive sprocket wheel, a chain, a driven sprocket wheel, and the like.

A pedal crank shaft is a member that is also used in a generic bicycle that is not an electrically assisted bicycle. In generic bicycles, various techniques are employed to suppress rattling of the pedal crank shaft by eliminating interspaces associated with the pedal crank shaft along the axial direction. For example, structures in which the pedal crank shaft is screwed in the axial direction, structures in which nuts are employed to eliminate interspaces, etc., are known. The axial direction of the pedal crank shaft is also referred to as the "thrust direction".

In the drive unit of an electrically assisted bicycle, thrust loads to the right and left of the pedal crank shaft are received by bearings on both sides. A one-way clutch is coaxial with the pedal crank shaft, and some interspace (play) is needed along the thrust direction for allowing relative rotations between members composing the one-way clutch (i.e., for tolerating sliding between a number of mechanical parts).

However, a user who is accustomed to generic bicycles may recognize any movement of the pedal crank shaft along the thrust direction that is caused by such an interspace as "rattling". Since portions that would normally not move are moving, the user may perceive it as an abnormality (loosening).

SUMMARY OF THE INVENTION

Preferred embodiments of the present invention provide drive units in each of which rattling of a pedal crank shaft is significantly reduced or prevented, and electrically assisted bicycles including drive units.

A drive unit according to a preferred embodiment of the present invention is mountable to a body frame of an electrically assisted bicycle to generate a driving power which is transmitted to a wheel of the electrically assisted bicycle, the drive unit including a housing; an electric motor fixed to the housing; a pedal crank shaft extending through the housing along a right-left direction of the electrically assisted bicycle; and a pair of bearings each including an inner wheel and an outer wheel, the pedal crank shaft being supported by the pair of bearings so as to be able to rotate within the housing; wherein the pair of bearings include a first bearing located at one side of the pedal crank shaft along a thrust direction and a second bearing located at another side of the pedal crank shaft along the thrust direction, the thrust direction corresponding to an axial direction of the pedal crank shaft; the first bearing is provided so as not to move relative to the pedal crank shaft along the thrust direction; the drive unit further includes a movement restrictor to restrict movement of the first bearing relative to the housing along the thrust direction; the outer wheel of the first bearing includes an inner peripheral surface, an outer peripheral surface, and a first end surface and a second end surface that connect the inner peripheral surface and the outer peripheral surface, the first end surface being located more outward than the second end surface along the right-left direction of the electrically assisted bicycle; the housing includes an abutting portion that abuts with the first end surface of the outer wheel of the first bearing, and a groove that is located more inward than the abutting portion along the right-left direction; and the movement restrictor includes the abutting portion, the groove of the housing, and an elastic member fitted in the groove.

As a result, rattling of the pedal crank shaft along the thrust direction is significantly reduced or prevented.

In a preferred embodiment of the present invention, the elastic member elastically deforms by being pressed by the second end surface of the outer wheel and a wall of the groove such that the elastic member urges the outer wheel from the second end surface side toward the first end surface side.

When the load externally applied to the pedal crank shaft is smaller than the force with which the elastic member pushes the outer wheel, the pedal crank shaft does not move along the thrust direction. As a result, rattling of the pedal crank shaft along the thrust direction is significantly reduced or prevented.

In a preferred embodiment of the present invention, in the housing, the pedal crank shaft is able to move along the thrust direction by a predetermined distance; and a length over which the elastic member is able to elastically deform along the thrust direction is longer than the distance.

When a load externally applied to the pedal crank shaft along the thrust direction is concentrated on the wall of the groove, the burden on the wall increases. In a preferred embodiment of the present invention, when the load applied to the pedal crank shaft becomes greater than the compression that the elastic member applies to the first bearing, the pedal crank shaft moves along the thrust direction. When the pedal crank shaft moves, the outer wheel of the second bearing abuts with the second abutting portion of the second case. As a result, a portion of the external load also acts on the second abutting portion of the second case. Because the load is received also by portions other than the wall of the groove, even if a large load occurs, the load is able to be dispersed such that the burden on the wall of the groove is reduced.

In the housing, the pedal crank shaft is able to move along the thrust direction by the predetermined distance D1. The length D2 over which the elastic member fitted in the groove is able to elastically deform along the thrust direction is longer than the distance D1. In a state in which the pedal crank shaft has moved by this largest distance D1, the elastic member is still able to further elastically deform. As a result, the outer wheel of the second bearing abuts with the second abutting portion of the second case to allow a portion of the external load to be applied to the second abutting portion.

In a preferred embodiment of the present invention, the inner wheel of the first bearing is press-fitted onto the pedal crank shaft.

Because the movement of the first bearing along the thrust direction is restricted, movement of the pedal crank shaft along the thrust direction is also restricted.

In a preferred embodiment of the present invention, an elastic force that the elastic member applies to the outer wheel of the first bearing while undergoing an elastic deformation by the length over which the elastic member is able to elastically deform is smaller than a force which causes the inner wheel to be disengaged from the pedal crank shaft.

As a result, the inner wheel of the first bearing is prevented from becoming disengaged from the pedal crank shaft.

In a preferred embodiment of the present invention, the elastic member includes a wave spring.

Because the movement of the first bearing is restricted by the wave spring, rattling of the pedal crank shaft along the thrust direction is significantly reduced or prevented.

In a preferred embodiment of the present invention, wherein the wave spring is C-ring shaped or substantially C-ring shaped.

As a result, the wave spring is restrained or prevented from expanding toward the outer periphery when the wave spring undergoes elastic deformation. Moreover, when assembling the drive unit, it is easier to place the wave spring in a desired position. For example, the wave spring is able to glide over the wall of the groove so as to be easily placed in the groove.

In a preferred embodiment of the present invention, the groove is ring shaped or substantially ring shaped to accommodate an outer periphery of the wave spring.

This allows the wave spring to be located at a desired position. Thus, an interspace needed for the elastic deformation of the wave spring is provided.

In a preferred embodiment of the present invention, the outer wheel of the first bearing is able to slide against the housing.

Because the first bearing is able to slide, the wave spring is able to elastically deform in accordance with the load.

In a preferred embodiment of the present invention, a protrusion extending in a radial direction is provided on the pedal crank shaft; the inner wheel of the first bearing includes an inner peripheral surface, an outer peripheral surface, and a third end surface and a fourth end surface that connect the inner peripheral surface and the outer peripheral surface of the inner wheel; the fourth end surface is located more inward than the third end surface along the right-left direction of the electrically assisted bicycle; and the protrusion of the pedal crank shaft abuts with the fourth end surface of the inner wheel.

Because the protrusion of the pedal crank shaft abuts with the fourth end surface, movement of the pedal crank shaft from the fourth end surface side toward the third end surface side is significantly reduced or prevented. As a result, rattling of the pedal crank shaft along the thrust direction is significantly reduced or prevented.

An electrically assisted bicycle according to a preferred embodiment of the present invention includes the drive unit according to any of the above preferred embodiments of the present invention.

As a result, an electrically assisted bicycle significantly reduces or prevents rattling of the pedal crank shaft along the thrust direction.

A drive unit according to a preferred embodiment of the present invention may include an abutting portion to abut with an outer wheel of a first bearing, a groove that is located more inward than the abutting portion, and an elastic member fitted in the groove. As a result, rattling of the pedal crank shaft along the thrust direction is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
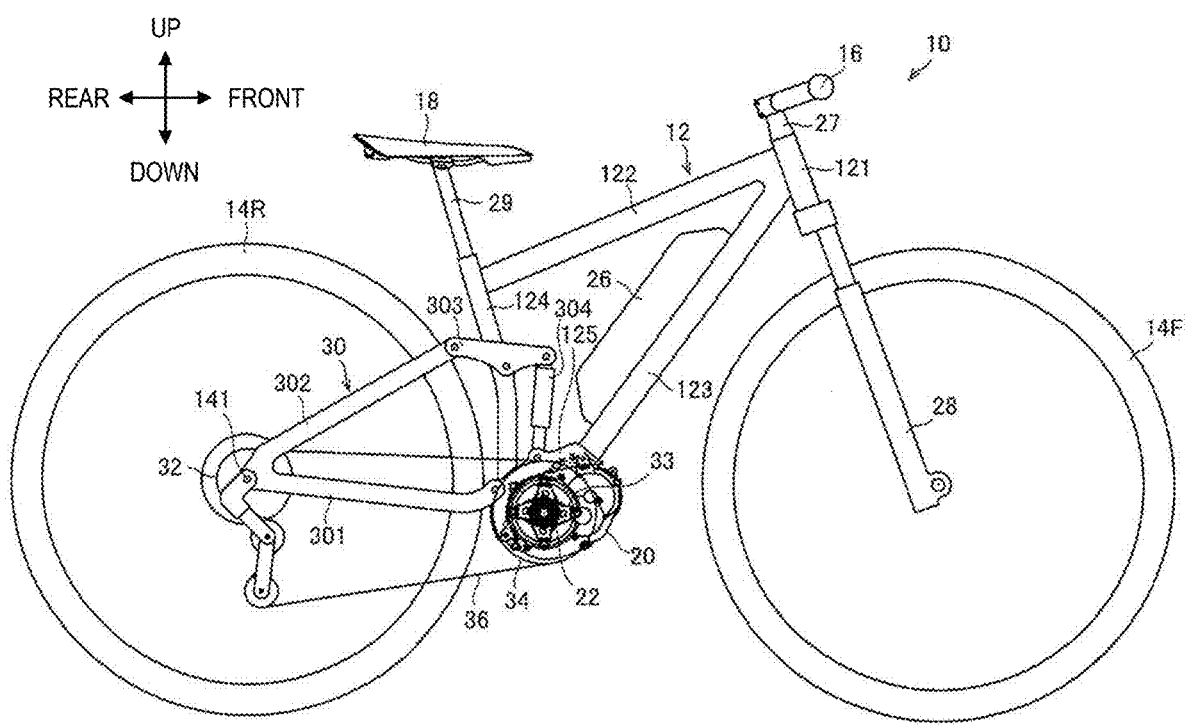
FIG. 1 is a right side view showing an electrically assisted bicycle 10 according to a preferred embodiment of the present invention.

Hereinafter, with reference to the drawings, drive systems according to preferred embodiments of the present invention, and electrically assisted bicycles including such drive systems according to other preferred embodiments of the present invention, will be described. In the description of the preferred embodiments, like component elements will be denoted by like reference numerals, and any redundant description thereof will be omitted. In preferred embodiments of the present invention, the terms "front", "rear", "right", "left", "up", and "down" respectively mean the front, rear, right, left, up, and down as viewed from a rider who sits on the saddle (seat) of the electrically assisted bicycle while facing the handle bar. The following preferred embodiments are only illustrative, and the present invention is not limited to the following preferred embodiments.

With reference to FIG. 1, an electrically assisted bicycle 10 according to a preferred embodiment of the present invention will be described. FIG. 1 is a right side view showing the schematic configuration of the electrically assisted bicycle 10.

The electrically assisted bicycle 10 includes a body frame 12, a front wheel 14F, a rear wheel 14R, a handle bar 16, and a saddle 18. The electrically assisted bicycle 10 further includes a drive unit 20 and a battery unit 26.

The body frame 12 includes a head tube 121, a top tube 122, a down tube 123, a seat tube 124, and a bracket 125.

The head tube 121, extending along the up-down direction, is provided at the front of the body frame 12. A stem 27 is inserted in the head tube 121 so as to be able to rotate. The handle bar 16 is fixed at the upper end of the stem 27. Front forks 28 are fixed at the lower end of the stem 27. At the lower end of the front forks 28, the front wheel 14F is mounted so as to be able to rotate. In other words, the front wheel 14F is supported by the body frame 12 via the stem 27 and the front forks 28.

The top tube 122, extending along the front-rear direction, is provided at the rear of the head tube 121. The front end of the top tube 122 is connected to the head tube 121. The rear end of the top tube 122 is connected to the seat tube 124.

The down tube 123, extending along the front-rear direction, is provided at the rear of the head tube 121. The down tube 123 is located below the top tube 122. The front end of the down tube 123 is connected to the head tube 121. In the example shown in FIG. 1, the front end portion of the down tube 123 is also connected to the front end portion of the top tube 122. The rear end of the down tube 123 is connected to the bracket 125.

The battery unit 26 is mounted on the down tube 123. The battery unit 26 supplies electric power to the drive unit 20. The battery unit 26 includes a battery and a control circuit. The battery is a rechargeable battery that is able to be charged and discharged. The control circuit controls charging and discharging of the battery, and also monitors the output current, remaining power, etc., of the battery.

The seat tube 124, extending along the up-down direction, is provided at the rear of the top tube 122 and the down tube 123. The lower end of the seat tube 124 is connected to the bracket 125. In other words, the seat tube 124 extends upward from the bracket 125.

In the example shown in FIG. 1, the seat tube 124 is bent at an intermediate portion along the up-down direction. As a result of this, a lower portion of the seat tube 124 extends along the up-down direction, while an upper portion of the seat tube 124 extends along a direction which is inclined with respect to the up-down direction.

A seat post 29 is inserted in the seat tube 124. The saddle 18 is mounted at the upper end of the seat post 29.

The bracket 125 is located at the lower end of the body frame 12. The bracket 125 supports the drive unit 20. The drive unit 20 mounted on the body frame 12 generates a driving power to be transmitted to a wheel (which herein is the rear wheel 14R). Details of the drive unit 20 will be described below.

The body frame 12 further includes a swingarm 30, a pair of connection arms 303, and a suspension 304. The swingarm 30 includes a pair of chain stays 301 and a pair of seat stays 302.

The pair of chain stays 301 each extend along the front-rear direction. The pair of chain stays 301 are located side-by-side along the right-left direction. The rear wheel 14R is located between the pair of chain stays 301. The pair of chain stays 301 are positioned symmetrically to the right and left. For this reason, FIG. 1 only illustrates the right chain stay 301.

The front end portion of each chain stay 301 is mounted to the bracket 125. In other words, each chain stay 301 extends rearward from the bracket 125. Each chain stay 301 is able to swing with respect to the bracket 125 around an axis which extends along the right-left direction.

A wheel axis 141 of the rear wheel 14R is mounted at the rear end portion of each chain stay 301 in such a manner that the wheel axis 141 itself is unable to rotate. In other words, the pair of chain stays 301 together support the rear wheel 14R in such a manner that the rear wheel 14R is able to rotate around the wheel axis 141. That is, the rear wheel 14R is supported on the body frame 12. A plurality of driven sprocket wheels 32 are fixed on the rear wheel 14R.

The pair of seat stays 302 each extend along the front-rear direction. The pair of seat stays 302 are located side-by-side along the right-left direction. The rear wheel 14R is located between the pair of seat stays 302. The pair of seat stays 302 are positioned symmetrically to the right and left. For this reason, FIG. 1 only illustrates the right seat stay 302.

The rear end portion of the left seat stay 302 is connected to the rear end portion of the left chain stay 301. The rear end portion of the right seat stay 302 is connected to the rear end portion of the right chain stay 301.

The pair of connection arms 303 each extend along the front-rear direction. The pair of connection arms 303 are positioned side-by-side along the right-left direction. The seat tube 124 is located between the pair of connection arms 303. The pair of connection arms 303 are positioned symmetrically to the right and left. For this reason, FIG. 1 only illustrates the right connection arm 303.

Each connection arm 303 is mounted on the seat tube 124. Each connection arm 303 is able to swing with respect to the seat tube 124 around an axis which extends along the right-left direction.

As viewed from a side surface of the vehicle, the front end of each connection arm 303 is located forward of the seat tube 124. As viewed from a side surface of the vehicle, the rear end of each connection arm 303 is located rearward of the seat tube 124.

The rear end portion of the left connection arm 303 is mounted at the front end portion of the left seat stay 302. The left connection arm 303 is able to swing with respect to the left seat stay 302 around an axis which extends along the right-left direction.

The rear end portion of the right connection arm 303 is mounted at the front end portion of the right seat stay 302. The right connection arm 303 is able to swing with respect to the right seat stay 302 around an axis which extends along the right-left direction.

The suspension 304 is located forward of the seat tube 124 and rearward of the down tube 123. The upper end portion of the suspension 304 is mounted on the pair of connection arms 303. The suspension 304 is able to swing with respect to the pair of connection arms 303 around an axis which extends along the right-left direction. The lower end portion of the suspension 304 is mounted on the bracket 125. The suspension 304 is able to swing with respect to the bracket 125 around an axis which extends along the right-left direction. The position at which the bracket 125 is mounted to the suspension 304 is forward of the position at which the bracket 125 is mounted to the seat tube 124.

Via a supporting member 33, a drive sprocket wheel 34 is mounted on the drive unit 20. A chain 36 is wound around the drive sprocket wheel 34 and the driven sprocket wheels 32.

Figure 2:
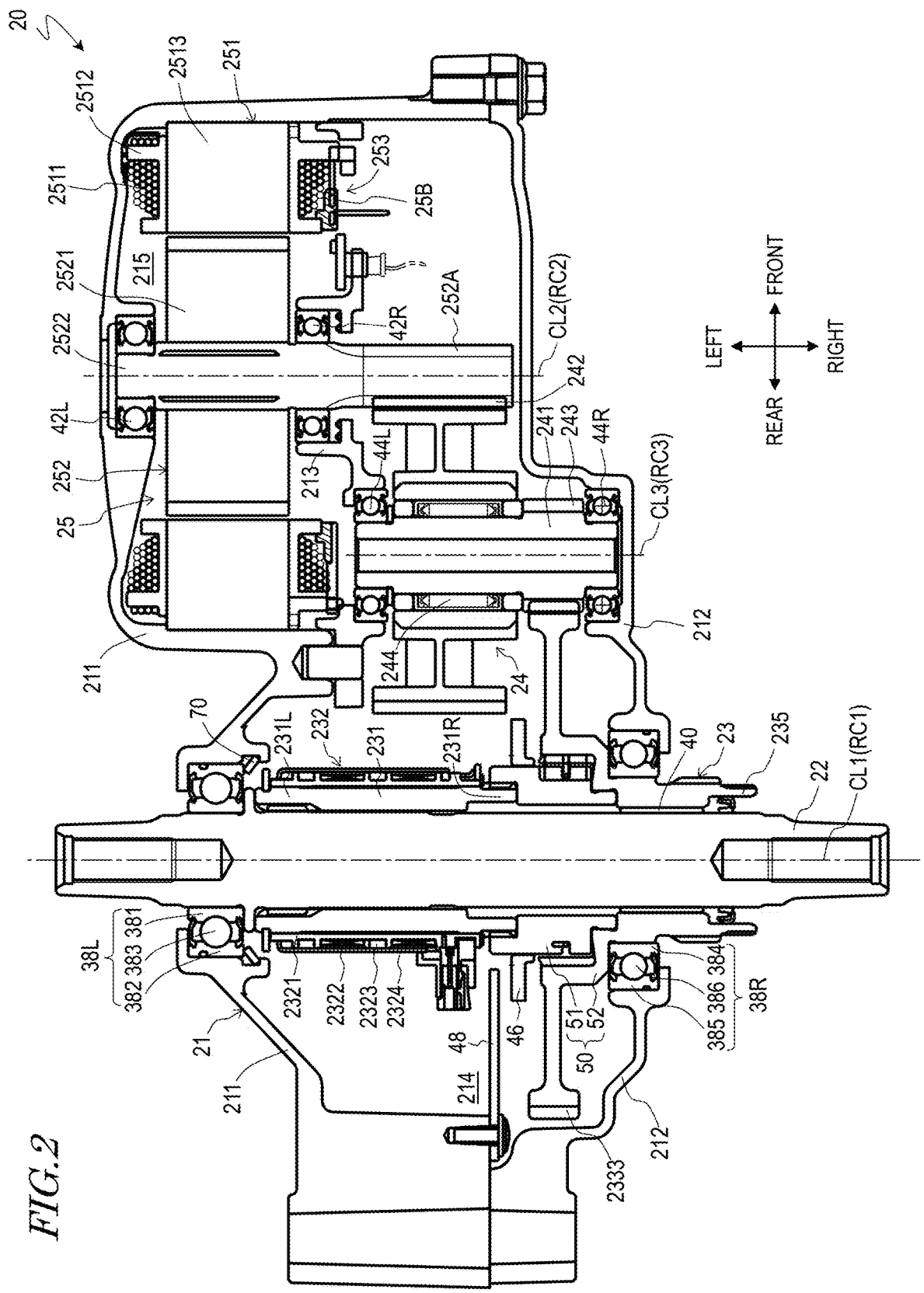
FIG. 2 is a cross-sectional view showing the internal structure of a drive unit 20 of the electrically assisted bicycle 10 according to a preferred embodiment of the present invention.

With reference to FIG. 2, an exemplary configuration of the drive unit 20 will be described. FIG. 2 is a cross-sectional view showing the internal structure of the drive unit 20.

As shown in FIG. 2, the drive unit 20 includes a housing 21, a pedal crank shaft 22, a rotary shaft (axle) 23, a speed reducer 24, and an electric motor 25.

First, the configuration of the housing 21 according to a preferred embodiment of the present invention will be described.

The housing 21 is fixed to the bracket 125 (FIG. 1) by a plurality of fastening members. The housing 21 includes a first case 211, a second case 212, and an inner cover 213. The first case 211, the second case 212, and the cover 213 are preferably each made of a metal material (e.g., an aluminum alloy).

In terms of the right-left direction, the second case 212 is overlaid on the first case 211 from the right. The first case 211 is fixed to the second case 212 by a plurality of fastening members. As a result, a space 214 is created between the first case 211 and the second case 212.

In terms of the right-left direction, the inner cover 213 is overlaid from the right in a manner to close the recess of the first case 211 in which the electric motor 25 is accommodated. The inner cover 213 is fixed to the first case 211 by a plurality of fastening members. As a result, between the left portion of the first case 211 and the inner cover 213, a space 215 that is covered by the first case 211 and the inner cover 213 is created. The electric motor 25 is accommodated in the space 215.

Next, the configuration of the pedal crank shaft 22 according to a preferred embodiment of the present invention will be described.

The pedal crank shaft 22 extends through the housing 21 along the vehicle's right-left direction. In other words, the center axis CL1 of the pedal crank shaft 22 extends along the right-left direction. As viewed along the axial direction (thrust direction) of the pedal crank shaft 22, the center axis CL1 defines the axis of rotation RC1 of the pedal crank shaft 22. The pedal crank shaft 22 rotates with respect to the housing 21 around the center axis CL1.

The pedal crank shaft 22 is rotatably supported by a pair of bearings 38L and 38R within the housing 21. One (38L) of the pair of bearings 38L and 38R is located at one side of the pedal crank shaft 22 along the thrust direction (which herein is the left side), hereinafter referred to as the "first bearing". On the other hand, the other (38R) of the pair of bearings 38L and 38R is located at the other side of the pedal crank shaft 22 (which herein is the right side) along the thrust direction, hereinafter referred to as the "second bearing".

The first bearing 38L is preferably a roller bearing that includes an inner ring 381, an outer ring 382, and a rolling element 383. The first bearing 38L is positioned so as not to move along the thrust direction relative to the pedal crank shaft 22. In the example shown in FIG. 2, the inner ring 381 of the first bearing 38L is press-fitted to the pedal crank shaft 22. The outer ring 382 of the first bearing 38L is urged in the left direction by an elastic member 70.

The second bearing 38R is preferably a roller bearing that includes an inner ring 384, an outer ring 385, and a rolling element 386. The second bearing 38R rotatably supports the pedal crank shaft 22 via an outer member 52 of a one-way clutch 50 and a plain bearing(s) 40, which will be described below.

The pedal crank shaft 22 extends through the rotary shaft 23. The rotary shaft 23 is accommodated in the housing 21. Details of the rotary shaft 23 will be described below. The pedal crank shaft 22 includes a pair of right- and left-crank arms (not shown) mounted thereto. Pedals (not shown) are mounted on the crank arms.

Next, the configurations of the electric motor 25 and the speed reducer 24 according to a preferred embodiment of the present invention will be described.

The electric motor 25 is accommodated in, and fixed to, the housing 21. The electric motor 25 generates a driving power which assists the travel of the electrically assisted bicycle 10. The electric motor 25 includes a stator 251 and a rotor 252.

The stator 251 includes a plurality of (e.g., fourteen) bobbins 2512, around which coils 2511 are wound. An iron core 2513 is inserted in each bobbin 2512. The stator 251 is provided in the space 215. In this state, the stator 251 is fixed to the first case 211.

A supporting member 253 is mounted on the stator 251. The supporting member 253 is preferably made of a resin material, for example. A plurality of busbars 25B are embedded in the supporting member 253. Each busbar 25B is connected to a corresponding coil 2511. By controlling power to the busbars 25B, a magnetic force is generated in the stator 251.

The rotor 252 is located inside the stator 251. The center axis CL2 of the rotor 252 is parallel or substantially parallel to the center axis CL1 of the pedal crank shaft 22. In other words, the rotor 252 is parallel or substantially parallel to the pedal crank shaft 22. As viewed along the axial direction of the pedal crank shaft 22, the center axis CL2 defines the axis of rotation RC2 of the rotor 252.

The rotor 252 includes a rotor main body 2521 and an output shaft 2522. These will now be described. The outer peripheral surface of the rotor main body 2521 is alternately magnetized into N-poles and S-poles along the peripheral direction. In the present preferred embodiment, there are seven N-poles and seven S-poles, for example.

The output shaft 2522 extends through the rotor main body 2521. The output shaft 2522 is fixed to the rotor main body 2521. In other words, the output shaft 2522 rotates together with the rotor main body 2521.

With the two bearings 42L and 42R, the output shaft 2522 is supported so as to be able to rotate relative to the housing 21 around the center axis CL2. The bearing 42L is fixed to the first case 211. The bearing 42R is located more toward the right side than the rotor main body 2521, and is fixed to the inner cover 213. The output shaft 2522 extends through the inner cover 213. In a portion of the output shaft 2522 that is located in the space 214, an output gear 252A is provided. The output gear 252A is a helical gear, for example.

The speed reducer 24 is accommodated in the housing 21. Specifically, the speed reducer 24 is located within the space 214. The speed reducer 24 includes a transmission shaft 241, a first transmission gear 242, and a second transmission gear 243. The transmission shaft 241 is preferably a gear rotary shaft.

The transmission shaft 241 is located in the housing 21. The center axis CL3 of the transmission shaft 241 is parallel or substantially parallel to the center axis CL1 of the pedal crank shaft 22. In other words, the transmission shaft 241 extends parallel or substantially parallel to the center axis CL1 of the pedal crank shaft 22. As viewed along the axial direction of the transmission shaft 241, i.e., the axial direction of the pedal crank shaft 22, the center axis CL3 defines the axis of rotation RC3 of the transmission shaft 241.

With the two bearings 44L and 44R, the transmission shaft 241 is supported so as to be able to rotate around the center axis CL3. The bearing 44L is fixed to the inner cover 213. The bearing 44R is fixed to the second case 212.

The first transmission gear 242 is preferably made of a resin material, for example. The first transmission gear 242 is provided on the transmission shaft 241. The first transmission gear 242 is located closer to the bearing 44L than to the bearing 44R along the axial direction of the transmission shaft 241. The first transmission gear 242 meshes with the output gear 252A. As a result, a driving power which is generated by the electric motor 25 is transmitted from the output gear 252A to the first transmission gear 242. Between the first transmission gear 242 and the transmission shaft 241, a one-way clutch 244 is provided. As a result, the rotary force of the output gear 252A in the forward-rotation direction is transmitted to the transmission shaft 241 via the first transmission gear 242, while the rotary force of the output gear 252A in the backward-rotation direction is not transmitted to the transmission shaft 241. Moreover, the one-way clutch 244 prevents the rotary force of the pedal crank shaft 22 in the forward-rotation direction that is generated by the human force of the rider from being transmitted to the electric motor 25. The first transmission gear 242 is larger in diameter than the output gear 252A, and has more teeth than does the output gear 252A. In other words, the speed of the first transmission gear 242 is slower than that of the output gear 252A.

The second transmission gear 243 is preferably made of a metal material (e.g., iron). The second transmission gear 243 is provided on the transmission shaft 241. The second transmission gear 243 is located at a different position from the first transmission gear 242 along the axial direction of the transmission shaft 241. In the present preferred embodiment, the transmission shaft 241 and the second transmission gear 243 are monolithic, i.e., a single unitary piece. The second transmission gear 243 rotates together with the transmission shaft 241. Note that the second transmission gear 243 may be fixed to the transmission shaft 241 via a serration coupling (or press-fitting).

The rotary shaft 23 is coaxial with the pedal crank shaft 22, and is able to rotate with the pedal crank shaft 22. The rotary shaft 23 includes a connecting shaft 231 and a one-way clutch 50.

The connecting shaft 231 has a cylindrical shape. The pedal crank shaft 22 is inserted in the connecting shaft 231. The connecting shaft 231 is coaxial with the crank shaft 22.

The left end (i.e., one end portion) 231 of the connecting shaft 231 is linked to the pedal crank shaft 22 via a serration coupling or the like. As a result, regardless of whether the pedal crank shaft 22 rotates in the forward-rotation direction or the backward-rotation direction, the connecting shaft 231 rotates together with the crank shaft 22.

A torque detector 232 is provided around the connecting shaft 231. The torque detector 232 is supported by the first case 211.

The torque detector 232 detects a torque that occurs in the connecting shaft 231 as the driver moves the pedals. The torque detector 232 is preferably a magnetostrictive type. The torque detector 232 outputs a signal which is in accordance with the detected torque to a controller which is mounted on the circuit board 48. By referring to the torque signal which has been detected by the torque detector 232, the controller determines the state of pedaling by the driver, and thus controls the electric motor 25.

The torque detector 232 includes an attachment shaft 2321, a coil 2322, a detection element 2323, and a shield 2324.

The attachment shaft 2321 is mounted on the outer peripheral surface of the connecting shaft 231, and is able to relatively rotate with respect to the connecting shaft 231. The coil 2322 is provided on the outer peripheral surface of the attachment shaft 2321. A predetermined voltage is applied to the coil 2322. The detection element 2323 detects a change in voltage of the coil 2322 that is caused by distortion of the connecting shaft 231. As a result, a torque occurring in the connecting shaft 231, i.e., a torque occurring in the pedal crank shaft 22 rotating integrally with the connecting shaft 231, is detected. The shield 2324 prevents deterioration of the detection accuracy of the detection element 2323. The shield 2324 does not rotate with the connecting shaft 231.

Next, the configuration of the one-way clutch 50 according to a preferred embodiment of the present invention will be described.

Along the axial direction of the pedal crank shaft 22, the one-way clutch 50 is located to the right side of the torque detector 232. The one-way clutch 50 is coaxial with the pedal crank shaft 22. The one-way clutch 50 includes an inner member 51 and an outer member 52.

The inner member 51 preferably has a cylindrical shape. At the left end (i.e., the one end portion) of the inner member 51, the right end (i.e., the other end portion) 231R of the connecting shaft 231 is inserted. The inner member 51 is coaxial with the connecting shaft 231. In this state, the right end 231R of the connecting shaft 231 is linked to the left end of the inner member 51 via a serration coupling or the like. As a result, regardless of whether the connecting shaft 231 rotates in the forward-rotation direction or the backward-rotation direction, the inner member 51 rotates together with the connecting shaft 231. In other words, regardless of whether the pedal crank shaft 22 rotates in the forward-rotation direction or the backward-rotation direction, the inner member 51 rotates together with the pedal crank shaft 22. The connecting shaft 231 and the inner member 51 function as a crank rotation inputting shaft that rotates integrally with the pedal crank shaft 22.

A ring magnet 46 is fixed to the outer peripheral surface of the inner member 51. As viewed along the axial direction of the pedal crank shaft 22, the ring magnet 46 is located at a position that overlaps a portion of the circuit board 48.

The ring magnet 46 rotates together with the inner member 51. By using a detection element provided on the circuit board 48 to detect a change in the magnetic field that is caused by the rotation of the ring magnet 46, rotation of the pedal crank shaft 22 is detected.

The outer member 52 preferably has a cylindrical shape. The pedal crank shaft 22 is inserted in the outer member 52. The plain bearing(s) is located between the outer member 52 and the pedal crank shaft 22. As a result of this, the outer member 52 is able to rotate coaxially with the pedal crank shaft 22.

Between the outer member 52 and the inner member 51, a ratchet mechanism as a one-way clutch mechanism is provided. As a result, a rotary force of the inner member 51 in the forward-rotation direction is transmitted to the outer member 52, while the rotary force of the inner member 51 in the backward-rotation direction is not transmitted to the outer member 52. Moreover, a rotary force of the outer member 52 in the forward-rotation direction that has occurred through the rotation of the electric motor 25 is not transmitted to the inner member 51.

The outer member 52 is supported by the second bearing 38R so as to be able to rotate relative to the housing 21 around the center axis CL1 of the pedal crank shaft 22. The outer ring 385 of the second bearing 38R is free-fitted to the second case 212, with the inner ring 384 thereof being press-fitted to the outer member 52 of the one-way clutch 50.

The outer member 52 extends through the second case 212. The drive sprocket wheel 34 (FIG. 1) is mounted to a portion of the outer member 52 that is located outside (i.e., on the right side of) the housing 21, via the supporting member 33 (FIG. 1).

The outer member 52 includes a gear 2333. The gear 2333 meshes with a second transmission gear 243 of the speed reducer 24. The gear 2333 is larger in diameter than the second transmission gear 243, and has more teeth than does the second transmission gear 243. That is, the rotational speed of the gear 2333 is slower than the rotational speed of the second transmission gear 243.

The outer member 52 transmits a resultant force that is a combination of a human force (pedaling force) transmitted to the other end portion 231R of the connecting shaft 231 and an assisting driving power from the electric motor 25 to the drive sprocket wheel 34. With the outer member 52, a resultant force outputting shaft 235 which outputs a resultant force combining the human force which is input via the one-way clutch 50 and the assisting driving power which is input via the gear 2333 is achieved. The resultant force outputting shaft 235 is included in the rotary shaft 23.

The drive unit 20 according to the present preferred embodiment has a structure that significantly reduces or prevents rattling of the pedal crank shaft 22 along the thrust direction. Specifically, the drive unit 20 includes a movement restrictor to restrict movement of the first bearing 38L relative to the housing 21 along the thrust direction. Since an inner wheel 381 of the first bearing 38L is press-fitted onto the pedal crank shaft 22, the first bearing 38L and the pedal crank shaft 22 move in an integral manner. By restricting the movement of the first bearing 38L, movement of the pedal crank shaft 22 relative to the housing 21 along the thrust direction is restricted.

In the present preferred embodiment, to "restrict the movement" of the pedal crank shaft 22 and the first bearing 38L does not mean completely halting their movement along the thrust direction. When the load externally applied to the pedal crank shaft 22 is less than a predetermined magnitude, the movement restrictor according to the present preferred embodiment completely halts their movement along the thrust direction. On the other hand, when the load is more than the predetermined magnitude, it allows the pedal crank shaft 22 and the first bearing 38L to move along the thrust direction in accordance with the magnitude of the load, thus dispersing the load within the housing 21.

Hereinafter, with reference to FIG. 3 to FIG. 11, details of the movement restrictor of the drive unit 20 will be described.

Figure 3:
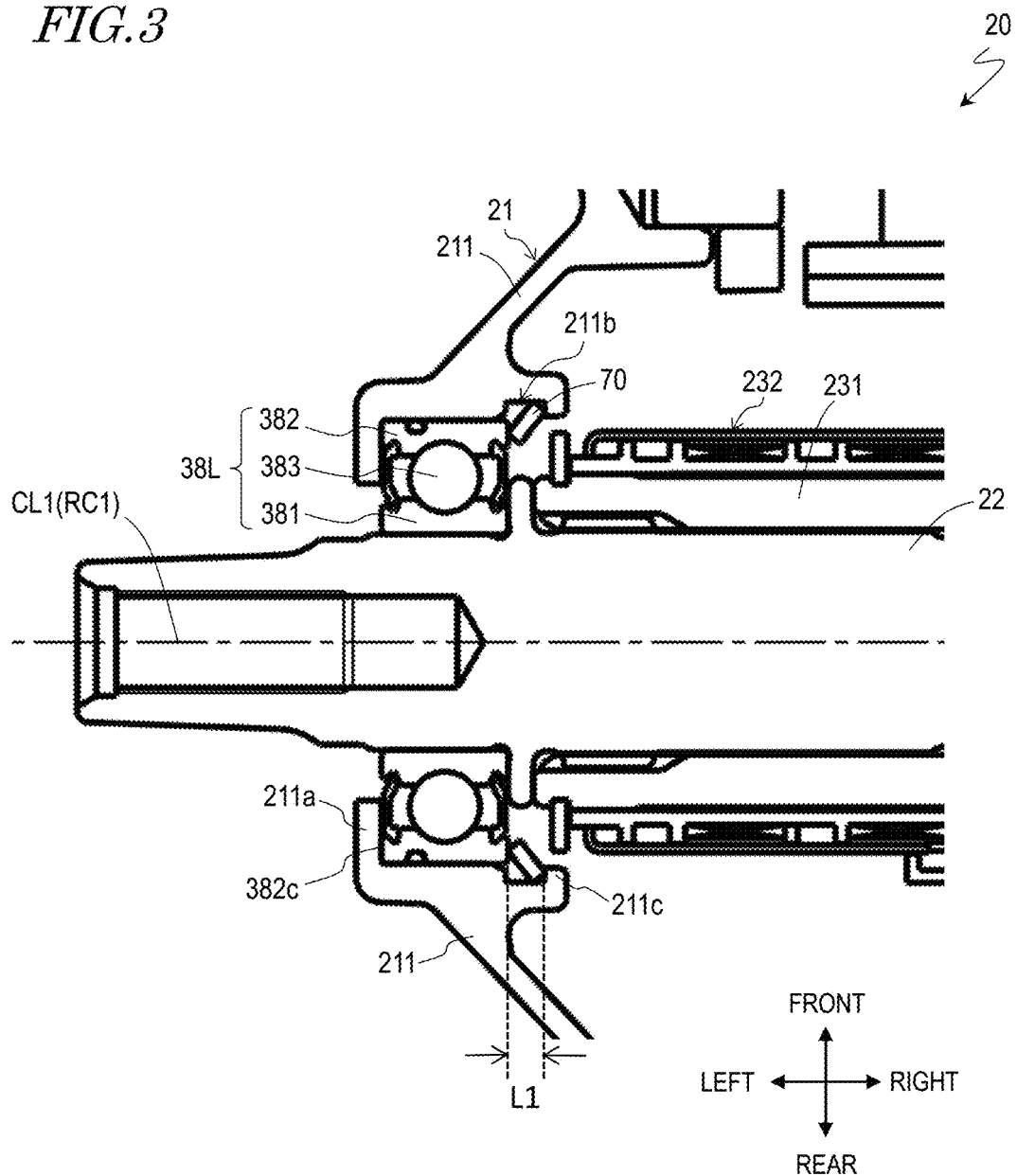
FIG. 3 is a cross-sectional view showing an enlarged area around a first bearing 38L of the drive unit 20 according to a preferred embodiment of the present invention.
Figure 4:
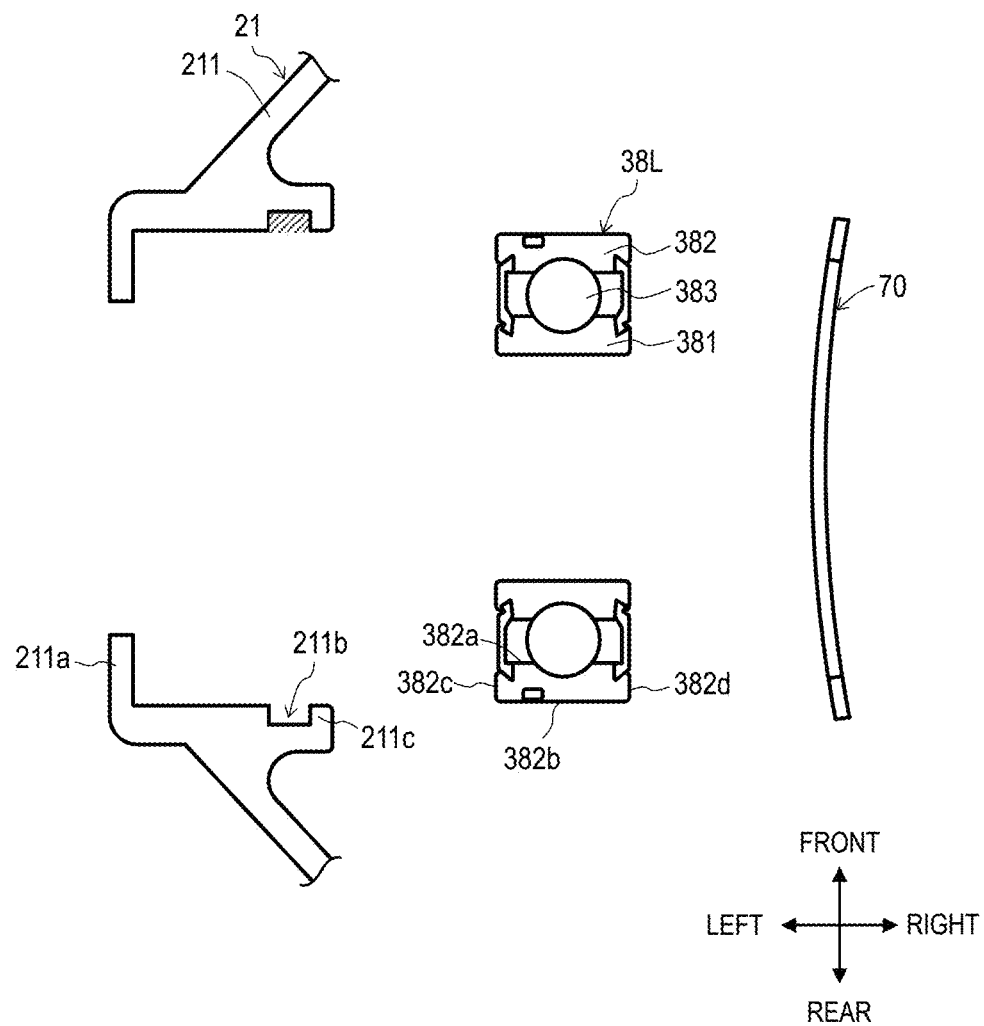
FIG. 4 is a cross-sectional view showing separated from one another a first case 211, a first bearing 38L, and an elastic member 70 of a housing 21 according to a preferred embodiment of the present invention.

First, FIG. 3 and FIG. 4 are referred to. FIG. 3 is a cross-sectional view showing an enlarged area around the first bearing 38L of the drive unit 20. FIG. 4 is a cross-sectional view showing the first case 211, the first bearing 38L, and the elastic member 70 of the housing 21 as separated from one another.

As described above, the inner wheel 381 of the first bearing 38L is press-fitted onto the pedal crank shaft 22. With the inner wheel 381 being press-fitted onto the pedal crank shaft 22, an outer wheel 382 of the first bearing 38L is free-fitted in the first case 211. The outer wheel 382 of the first bearing 38L is able to slide against the first case 211.

As shown in FIG. 4, the outer wheel 382 of the first bearing 38L has an inner peripheral surface 382a, an outer peripheral surface 382b, and a pair of end surfaces 382c and 382d by which the inner peripheral surface 382a and the outer peripheral surface 382b are connected to each other. Herein, the end surface 382c is referred to as the "first end surface", and the end surface 382d as the "second end surface". The first end surface 382c is located more outward than the second end surface 382d along the right-left direction.

The first case 211 includes a first abutting portion 211a that abuts with the first end surface 382c of the outer wheel 382 of the first bearing 38L. The first abutting portion 211a preferably is ring shaped or substantially ring shaped.

At a position on the first case 211, a groove 211b is provided so as to be more inward than the abutting portion 211a along the right-left direction. The groove 211b preferably has a concaved annular shape. The elastic member 70 is fitted in the groove 211b. In the present preferred embodiment, that "the elastic member 70 is fitted in the groove 211b" does not necessarily mean that the entire elastic member 70 is located inside the groove 211b (shown hatched in FIG. 4); rather, it means that at least a portion of the elastic member 70 is located inside the groove 211b, but that another portion thereof may be located outside the groove 211b. The portion of the elastic member 70 that is located outside the groove 211b abuts with the outer wheel 382 of the first bearing 38L. The elastic member 70 is preferably made of a metal material, for example. As the metal material, a carbon tool steel or a cold-rolled steel for springs may be used, for example.

Figure 5:
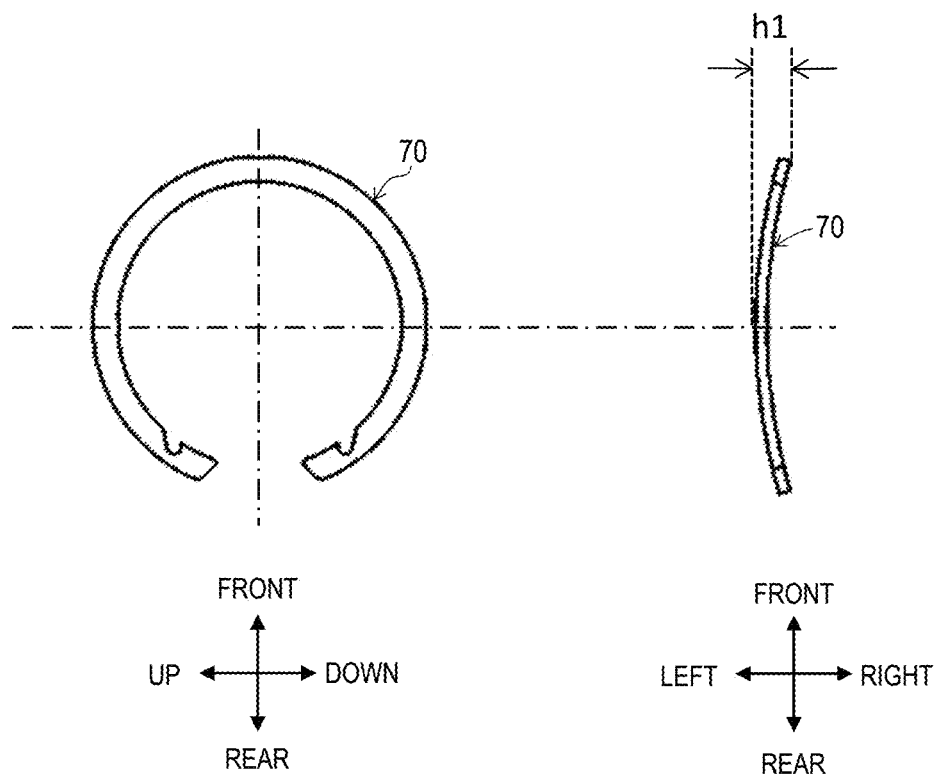
FIG. 5 is a diagram showing an example of a shape of the elastic member 70 according to a preferred embodiment of the present invention.

Now, an example shape of the elastic member 70 will be described. FIG. 5 is a diagram showing an example shape of the elastic member 70. The elastic member 70 in the present preferred embodiment may be a wave spring, for example. The left portion of FIG. 5 shows the shape of the elastic member 70 in a frontal view. The right portion of FIG. 5 shows the shape of the elastic member 70 in a side view.

In the frontal view, the wave spring may have a ring shape that is closed or a C-ring shape that is partially open. The wave spring is an elastic body that is able to undergo elastic deformation along the thrust direction. The wave spring is curved and has a wavy shape in the side view. Another name for the wave spring may be a wave washer. It may have one wave, or a plurality of waves. In the example shown in FIG. 5, the elastic member 70 is a wave spring having a C-ring shape. Specifically, the example shown in FIG. 5 illustrates the wave spring as having a C-ring shape such that both end portions of the spring are separated from each other; instead, a wave spring of an overlap type may be used such that both end portions overlap each other.

Figure 8:
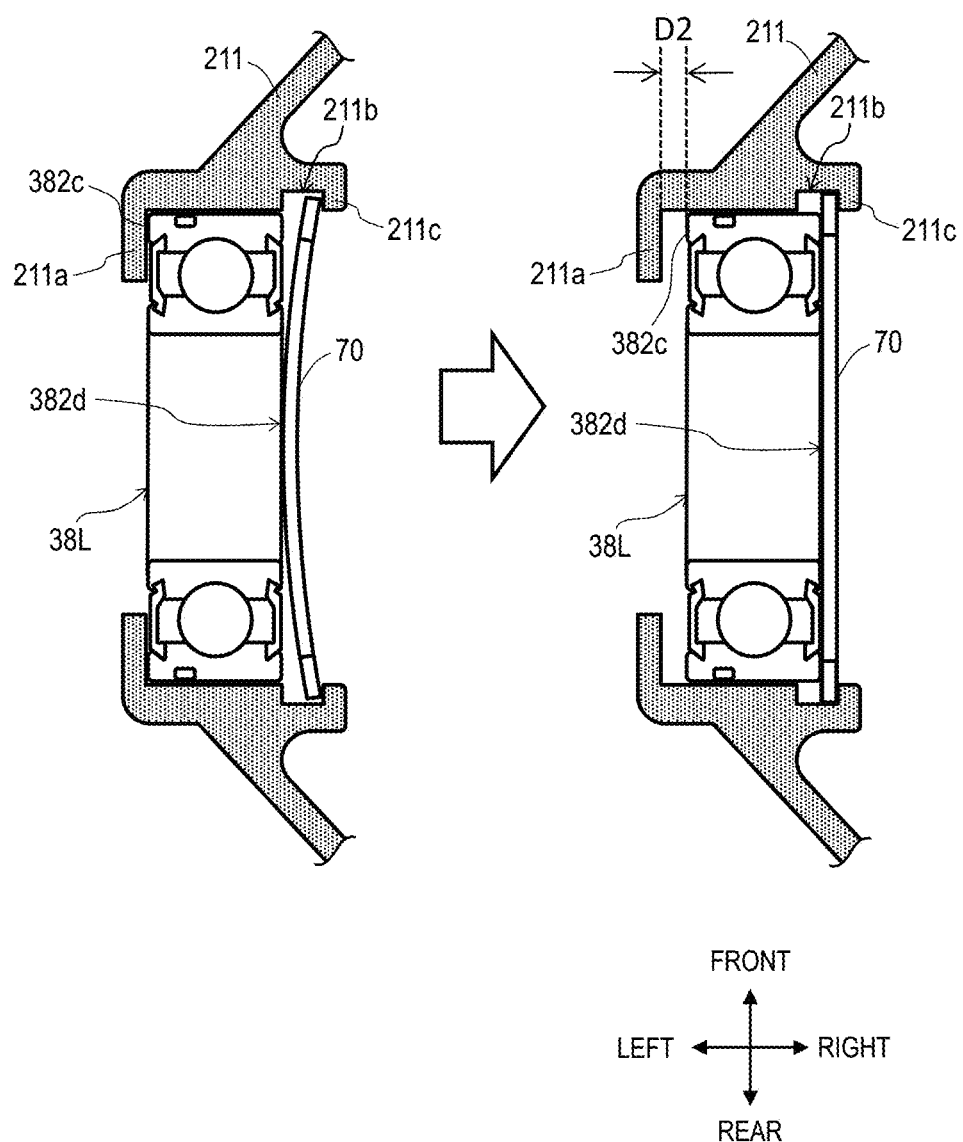
FIG. 8 is diagram showing the length over which the elastic member 70 according to a preferred embodiment of the present invention is able to elastically deform along the thrust direction.

Referring back to FIG. 3 and FIG. 4, the groove 211*b* has a ring shape in which the outer peripheral portion of the elastic member 70 fits. On the inner side of the groove 211*b* along the right-left direction (i.e., the right side of the groove 211*b*), a wall 211*c* that defines the groove 211*b* is provided. The outer peripheral portion of the elastic member 70 abuts with the wall 211*c*. The elastic member 70 also abuts with the second end surface 382*d* of the outer wheel 382 of the first bearing 38L (FIG. 8). The length L1 between the second end surface 382*d* of the first bearing 38L and the wall 211*c* along the right-left direction (FIG. 3) is smaller than the free height h1 (FIG. 5) of the elastic member 70 along the right-left direction. The free height refers to the height of the elastic member 70 in the absence of a load being applied on the elastic member 70.

The movement restrictor according to the present preferred embodiment includes the elastic member 70, whose outer peripheral portion fits in the groove 211*b*; and the abutting portion 211*a* and the groove 211*b* of the housing 21.

The elastic member 70 elastically deforms by being pressed between the second end surface 382*d* of the first bearing 38L and the wall 211*c*, thus urging the outer wheel 382 from the second end surface 382*d* side toward the first end surface 382*c* side. In other words, the elastic member 70 applies compression to the outer wheel 382 of the first bearing 38L.

When the load externally (i.e., from outside of the electrically assisted bicycle 10) applied to the pedal crank shaft 22 along the thrust direction is smaller than the force (compression) with which the elastic member 70 pushes the outer wheel 382, the pedal crank shaft 22 does not move along the thrust direction. As a result, rattling of the pedal crank shaft 22 along the thrust direction is significantly reduced or prevented.

In a preferred embodiment of the present invention, with the above-described movement restrictor, movement of the first bearing 38L relative to the housing 21 along the thrust direction is significantly reduced or prevented. The first bearing 38L is provided so as not to move relative to the pedal crank shaft 22 along the thrust direction. For example, the inner wheel 381 of the first bearing 38L is press-fitted onto the pedal crank shaft 22. Since movement of the first bearing 38L is significantly reduced or prevented by the movement restrictor, movement of the pedal crank shaft 22 relative to the housing 21 along the thrust direction is significantly reduced or prevented.

Moreover, suppression of the movement of the first bearing 38L is achieved as the first abutting portion 211*a* of the housing 21 and the elastic member 70 sandwich the outer wheel 382 of the first bearing 38L. In other words, the movement restrictor is completely located within the region where the first abutting portion 211*a* of the housing 21 and the elastic member 70 are located. Therefore, in the region that is located on the inner side (i.e., the right side) of the elastic member 70, it is possible to provide an interspace to allow relative rotation between portions that are coaxial with the pedal crank shaft 22. For example, an interspace to allow relative rotation between the inner member 51 and the outer member 52 of the one-way clutch 50 is provided.

Moreover, when the elastic member 70 is a wave spring having a C-ring shape, the wave spring is restrained or prevented from expanding toward the outer periphery when the wave spring undergoes elastic deformation. Moreover, when assembling the drive unit 20, it is easier to place the wave spring in a desired position. For example, the wave spring is able to glide over the wall 211*c* of the groove 211*b* so as to be easily placed in the groove 211*b*.

Next, movement of the pedal crank shaft 22 when there is a large load externally applied to the pedal crank shaft 22 will be described. When the load applied to the pedal crank shaft 22 along the thrust direction becomes greater than the compression that the elastic member 70 applies to the outer wheel 382, the pedal crank shaft 22 moves along the thrust direction.

Figure 6:
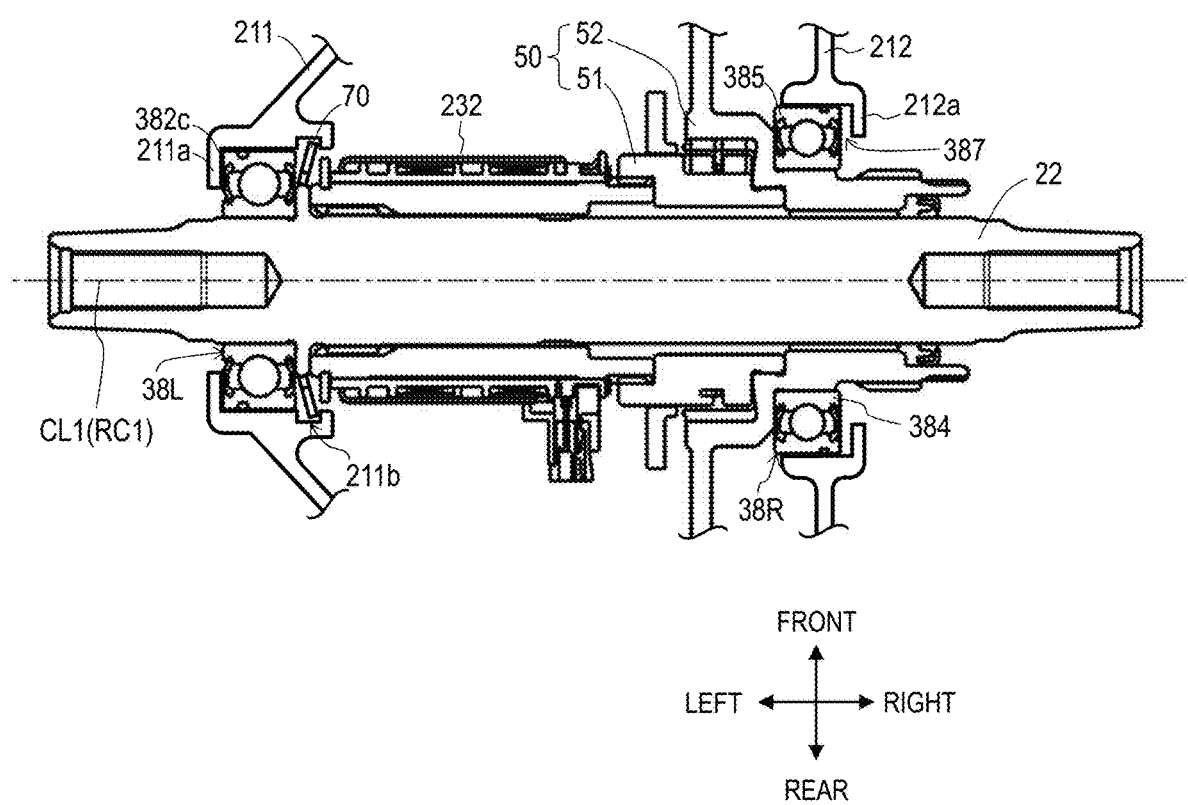
FIG. 6 is a diagram showing the distance over which a pedal crank shaft 22 according to a preferred embodiment of the present invention is able to move along the thrust direction within the housing 21.
Figure 7:
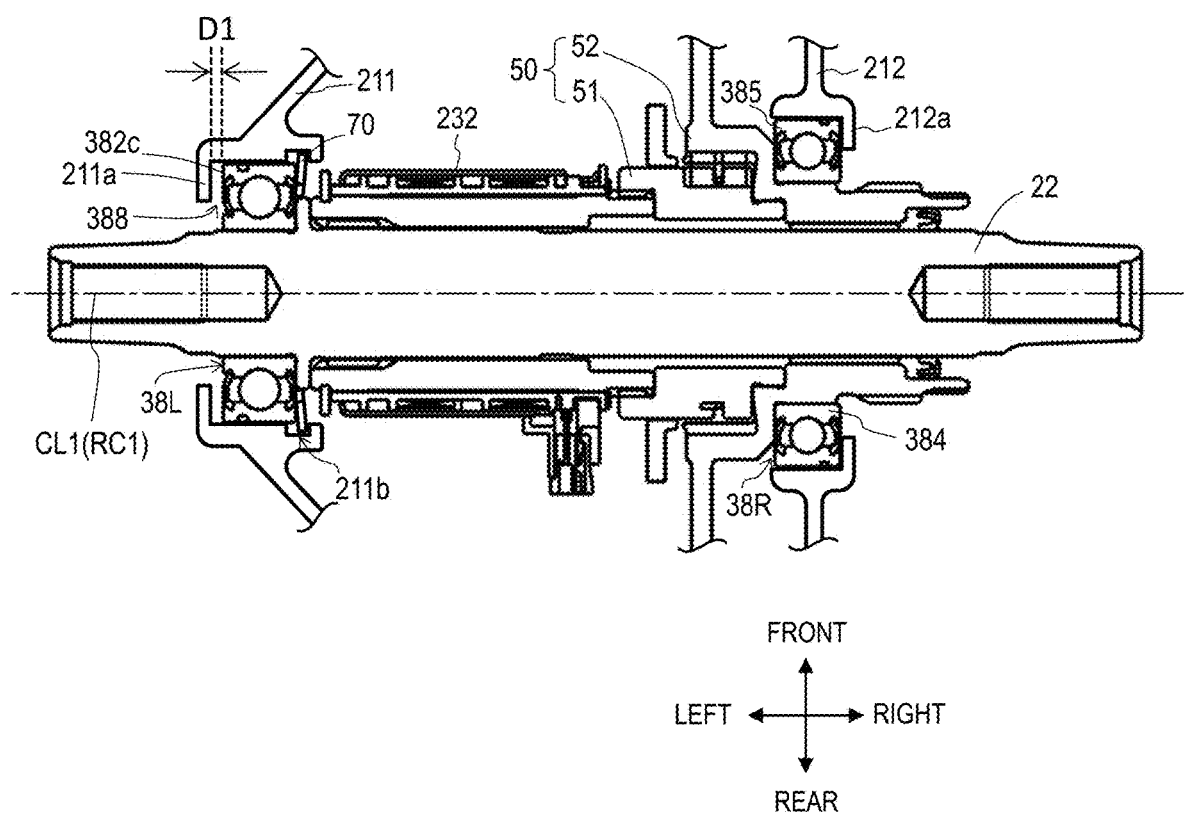
FIG. 7 is a diagram showing the distance over which the pedal crank shaft 22 according to a preferred embodiment of the present invention is able to move along the thrust direction within the housing 21.

First, the distance over which the pedal crank shaft 22 is able to move along the thrust direction within the housing 21 will be described. FIG. 6 and FIG. 7 are diagrams describing the distance over which the pedal crank shaft 22 is able to move along the thrust direction within the housing 21.

As described above, in the drive unit 20 of the electrically assisted bicycle 10, the one-way clutch 50 is coaxial with the pedal crank shaft 22, and an interspace (play) that allows relative rotation between the inner member 51 and the outer member 52 of the one-way clutch 50 is needed along the thrust direction.

FIG. 6 is a diagram showing a state in which the pedal crank shaft 22 and respective members provided on the pedal crank shaft 22 have each moved farthest in the left direction. FIG. 7 is a diagram showing a state in which the pedal crank shaft 22 and respective members provided on the pedal crank shaft 22 have each moved farthest in the right direction.

As has been described above with reference to FIG. 2, the inner wheel 384 of the second bearing 38R is press-fitted to the outer member 52 of the one-way clutch 50. With the inner wheel 384 being press-fitted to the outer member 52, the outer wheel 385 of the second bearing 38R is free-fitted in the second case 212. The second case 212 includes a second abutting portion 212*a* abutting with the outer wheel 385 of the second bearing 38R. The outer wheel 385 of the second bearing 38R is able to slide against the second case 212. In the state shown in FIG. 6, an interspace 387 is created between the outer wheel 385 of the second bearing 38R and the second abutting portion 212*a* of the second case 212. The first end surface 382*c* of the first bearing 38L abuts with the first abutting portion 211*a* of the first case 211.

When the load applied to the pedal crank shaft 22 along the thrust direction becomes greater than the compression that the elastic member 70 applies to the outer wheel 382, the pedal crank shaft 22 moves along the thrust direction. Concurrently with the movement of the pedal crank shaft 22 along the thrust direction, the first end surface 382*c* of the first bearing 38L is spaced from the first abutting portion 211*a* of the first case 211. An interspace 388 is created between the first end surface 382*c* and the first abutting portion 211*a*. As the load becomes greater, the displacement of the pedal crank shaft 22 increases, until reaching a state where, as shown in FIG. 7, the respective members have each moved farthest in the right direction. In this state, the length D1 of the interspace 387 along the thrust direction defines the distance over which the pedal crank shaft 22 is able to move along the thrust direction. In the state shown in FIG. 7, the outer wheel 385 of the second bearing 38R abuts with the second abutting portion 212a of the second case 212.

When in the state shown in FIG. 7, a portion of the external load also acts on the second abutting portion 212a, by way of the pedal crank shaft 22, the inner member 51 and the outer member 52 of the one-way clutch 50, and the second bearing 38R. Since the load is received also by portions other than the wall 211c of the groove 211b, even if a large load happens to act, the load is dispersed such that the burden on the wall 211c of the groove 211b is reduced.

Next, the length over which the elastic member 70 is able to elastically deform along the thrust direction within the drive unit 20 will be described. FIG. 8 is a diagram describing the length over which the elastic member 70 is able to elastically deform along the thrust direction. It is assumed that the first bearing 38L shown in FIG. 8 has not been mounted to the pedal crank shaft 22. In the state shown on the left side of FIG. 8, the first end surface 382c of the first bearing 38L abuts with the first abutting portion 211a of the first case 211.

In the state shown on the left side of FIG. 8, as described above, the elastic member 70 is elastically deformed by being pressed by the second end surface 382d of the first bearing 38L and the wall 211c. Through this deformation of the elastic member 70, the elastic member 70 applies compression to the outer wheel 382 of the first bearing 38L.

In the state shown on the left side of FIG. 8, when a load is applied in the right direction to the first bearing 38L, the first bearing 38L moves along the thrust direction. With the movement of the first bearing 38L, the elastic member 70 elastically deforms. In the structure according to the present preferred embodiment, for example, once the elastic member 70 has deformed to a point in which substantially the entire periphery of the elastic member 70 abuts with the second end surface 382d of the first bearing 38L, the elastic member 70 does not deform any more. The state shown on the right side of FIG. 8 is a state in which the elastic member 70 has elastically deformed the most.

Figure 9:
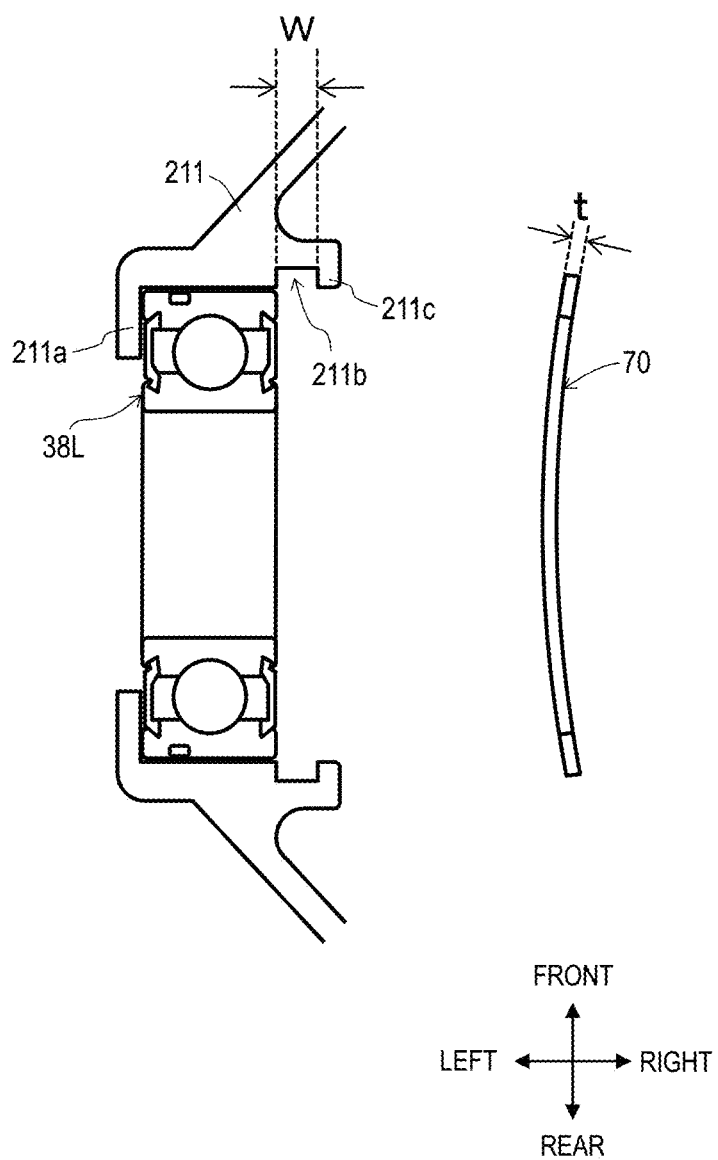
FIG. 9 is a diagram showing the width W of the groove 211b along the thrust direction and the thickness t of the elastic member 70 according to a preferred embodiment of the present invention.

Assume a distance D2 between the first end surface 382c and the first abutting portion 211a in the state shown on the right side of FIG. 8. This distance D2 is equal to the distance over which the elastic member 70 is able to elastically deform along the thrust direction from the state shown on the left side of FIG. 8 before reaching the state shown on the right side of FIG. 8. FIG. 9 is a diagram showing the width W of the groove 211b along the thrust direction and the thickness t of the elastic member 70. Referring to the state shown on the right side of FIG. 8 and FIG. 9, the distance D2 over which the elastic member 70 is able to elastically deform may be equal to the difference between the width W of the groove 211b and the thickness t of the elastic member 70.

Now, a relationship between the distance D1 (FIG. 7) over which the pedal crank shaft 22 is able to move along the thrust direction and the distance D2 (FIG. 8) over which the elastic member 70 is able to elastically deform will be discussed. In a preferred embodiment of the present invention, the distance D2 is longer than the distance D1. In other words, in the state in which the pedal crank shaft 22 and respective members provided on the pedal crank shaft 22 have each moved farthest in the right direction, the elastic member 70 is still able to further elastically deform. As a result, the outer wheel 385 of the second bearing 38R abuts with the second abutting portion 212a of the second case 212 thus allowing a portion of the external load to be applied to the second abutting portion 212a.

If the distance D2 were shorter than the distance D1, the pedal crank shaft 22 would stop moving before the load is applied via the second bearing 38R to the second abutting portion 212a. Then, the load would not be received by the second abutting portion 212a, and thus would not be dispersed. According to the present preferred embodiment, in which the distance D2 is longer than the distance D1, a portion of the external load is applied to the second abutting portion 212a, thus allowing the load to be dispersed.

Figure 10:
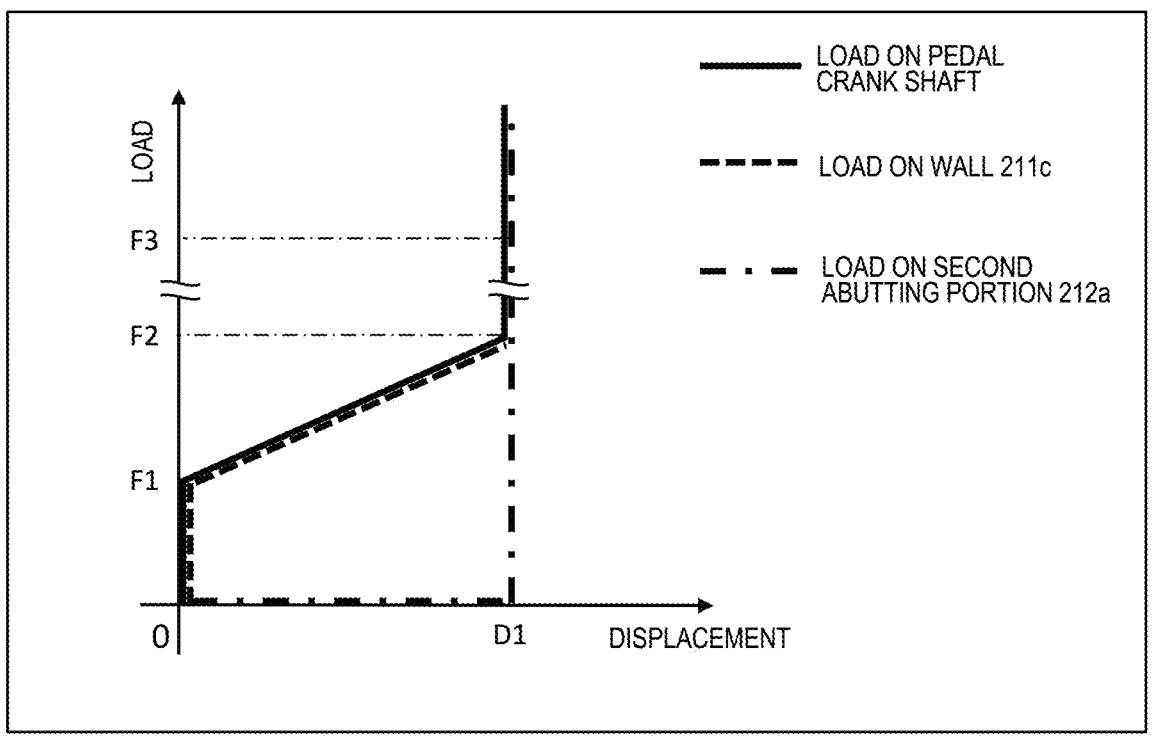
FIG. 10 is a diagram schematically showing a relationship between a load externally applied to the pedal crank shaft 22 along the thrust direction and the displacement of the pedal crank shaft 22 according to a preferred embodiment of the present invention.

FIG. 10 is a diagram schematically showing a relationship between a load externally applied to the pedal crank shaft 22 along the thrust direction and the displacement of the pedal crank shaft 22. The vertical axis in FIG. 10 represents a load externally applied to the pedal crank shaft 22 along the thrust direction. The horizontal axis represents a displacement of the pedal crank shaft 22.

When the magnitude of the load externally applied to the pedal crank shaft 22 exceeds F1, the elastic member 70 begins to deform. The load F1 is equal to the compression that the elastic member 70 applies to the outer wheel 382 of the first bearing 38L. As has been described with reference to FIG. 7, once the displacement of the pedal crank shaft 22 reaches D1, the pedal crank shaft 22 does not move any more. If a load equal to or greater than the load F2 existing when the displacement reaches D1 is applied to the pedal crank shaft 22, a portion of the load is applied to the second abutting portion 212a of the second case 212, thus allowing the load to be dispersed. As a result, the burden on the wall 211c of the groove 211b is reduced.

As described above, the inner wheel 381 of the first bearing 38L is press-fitted onto the pedal crank shaft 22. The force F3 that is needed for the press-fitted first bearing 38L to be disengaged from the pedal crank shaft 22 is greater than each of the load F1 and the load F2. The elastic force that the elastic member 70 applies to the outer wheel 382 of the first bearing 38L while undergoing an elastic deformation by a length over which elastic deformation is possible is smaller than a force which causes the inner wheel 381 of the first bearing 38L to be disengaged from the pedal crank shaft 22. As a result, the first bearing 38L is prevented from becoming disengaged from the pedal crank shaft 22 before the displacement of the pedal crank shaft 22 reaches D1.

After the displacement of the pedal crank shaft 22 reaches D1, the portion of the load exceeding F2 will be received by the second abutting portion 212a of the second case 212. Even if a load that is equal to or greater than the force F3 is applied to the pedal crank shaft 22, the load acting on the site of press-fitting between the pedal crank shaft 22 and the first bearing 38L does not exceed F2. As a result, even if a load that is equal to or greater than the force F3 is applied to the pedal crank shaft 22, the first bearing 38L is prevented from becoming disengaged from the pedal crank shaft 22.

Figure 11:
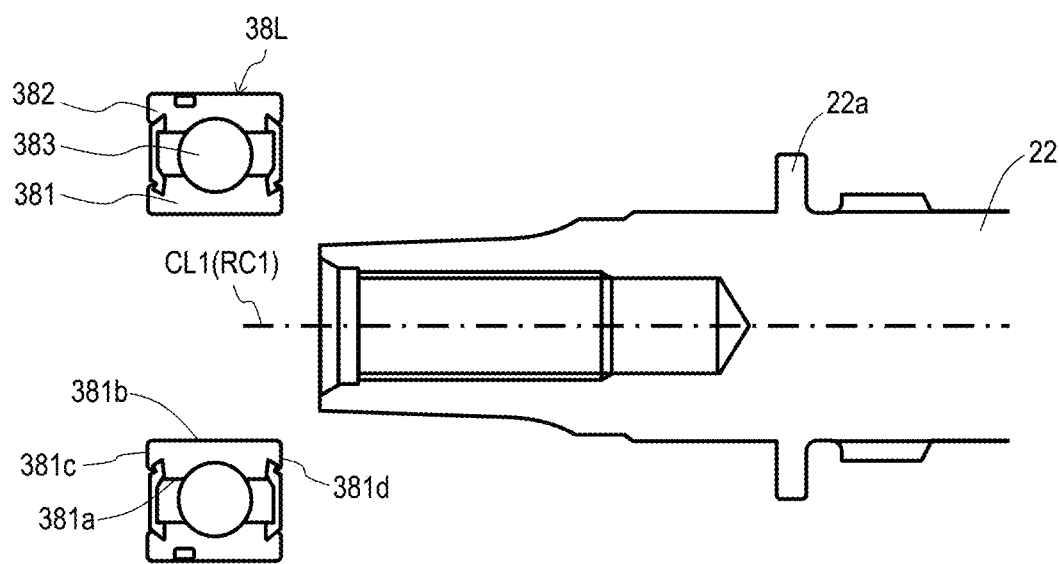
FIG. 11 is a diagram showing a protrusion 22a provided on the pedal crank shaft 22 according to a preferred embodiment of the present invention.

Next, a protrusion that is provided on the pedal crank shaft 22 will be described. FIG. 11 is a diagram showing a protrusion 22a provided on the pedal crank shaft 22. As shown in FIG. 11, the protrusion 22a extends in a radial direction from the pedal crank shaft 22. The protrusion 22a may be monolithic with the pedal crank shaft 22, for example. Moreover, the protrusion 22a may be implemented as a circlip and a washer mounted to the pedal crank shaft 22, for example.

The inner wheel 381 of the first bearing 38L has an inner peripheral surface 381a, an outer peripheral surface 381b, and a third end surface 381c and a fourth end surface 381d by which the inner peripheral surface 381*a* and the outer peripheral surface 381*b* are connected to each other. The fourth end surface 381*d* is located more inward than the third end surface 381*c* along the right-left direction of the electrically assisted bicycle 10.

With reference to FIG. 3 and FIG. 11, the protrusion 22*a* of the pedal crank shaft 22 abuts with the fourth end surface 381*d*. Since the protrusion 22*a* abuts with the fourth end surface 381*d*, movement of the pedal crank shaft 22 from the fourth end surface 381*d* side toward the third end surface 381*c* side is significantly reduced or prevented. This enables further reduction or prevention of rattling of the pedal crank shaft 22 along the thrust direction.

Preferred embodiments of the present invention have been described above. However, the present invention is not to be limited to the above-described preferred embodiments. For example, although the above-described preferred embodiments illustrate an electrically assisted bicycle including a suspension, preferred embodiments of the present invention can also be suitably used for electrically assisted bicycles that lack a suspension.

Although the above-described preferred embodiments illustrate a drive unit of a type in which a human force and an assistance force of the electric motor 25 are merged at an element that rotates coaxially with the pedal crank shaft 22 (merge-at-crank type), the present invention is not limited thereto. Preferred embodiments of the present invention are also suitably applicable to drive units of a type in which a human force and an assistance force are merged by a chain (merge-at-chain type). In the case of a merge-at-chain type, the outer member 52 does not have a gear 2333 to receive the assisting driving power from the electric motor 25.

In the above-described preferred embodiments, the electric motor 25 is accommodated in a recess that is provided in the first case 211 (FIG. 2) of the housing 21; however, the structure of the housing 21 is not limited thereto. For example, an aperture may be provided in the left portion of the first case 211 through which the electric motor 25 is inserted, and through this aperture, the electric motor 25 may be mounted to the housing 21. In that case, the aperture may be furnished with a cover to make the first case 211 dust-proof and water-proof.

Although the above preferred embodiments illustrate that the outer wheel 382 of the first bearing 38L is free-fitted in the first case 211, the outer wheel 382 may alternatively be press-fitted in the first case 211. When the external load is smaller than a force which is needed for the outer wheel 382 to be disengaged from the first case 211, rattling of the pedal crank shaft 22 along the thrust direction is significantly reduced or prevented.

Although the above preferred embodiments illustrate that the first bearing 38L is press-fitted onto the pedal crank shaft 22, the bearing 38L may be fixed to the pedal crank shaft 22 via adhesive bonding or with a circlip and the like.

Thus, illustrative preferred embodiments of the present invention have been described above.

A drive unit 20 according to a preferred embodiment of the present invention is mountable to a body frame 12 of an electrically assisted bicycle 10 to generate a driving power which is transmitted to a wheel 14R of the electrically assisted bicycle. The drive unit 20 includes a housing 21; an electric motor 25 fixed to the housing 21; a pedal crank shaft 22 extending through the housing 21 along a right-left direction of the electrically assisted bicycle 10; and a pair of bearings each including an inner wheel and an outer wheel, the pedal crank shaft 22 being supported by the pair of bearings so as to be able to rotate within the housing 21. The pair of bearings include a first bearing 38L located at one side of the pedal crank shaft 22 along a thrust direction and a second bearing 38R located at another side of the pedal crank shaft 22 along the thrust direction, the thrust direction corresponding to an axial direction of the pedal crank shaft 22. The first bearing 38L is provided so as not to move relative to the pedal crank shaft 22 along the thrust direction. The drive unit 20 further includes a movement restrictor to restrict movement of the first bearing 38L relative to the housing 21 along the thrust direction. The outer wheel 382 of the first bearing 38L includes an inner peripheral surface 382*a*, an outer peripheral surface 382*b*, and a first end surface 382*c* and a second end surface 382*d* by which the inner peripheral surface 382*a* and the outer peripheral surface 382*b* are connected to each other. The first end surface 382*c* is located more outward than the second end surface 382*d* along the right-left direction of the electrically assisted bicycle 10. The housing 21 includes an abutting portion 211*a* to abut with the first end surface 382*c* of the outer wheel 382 of the first bearing 38L; and a groove 211*b* that is located more inward than the abutting portion 211*a* along the right-left direction. The movement restrictor includes the abutting portion 211*a*, the groove 211*b* of the housing 21, and an elastic member 70 fitted in the groove 211*b*.

As a result, rattling of the pedal crank shaft 22 along the thrust direction is significantly reduced or prevented.

In a preferred embodiment of the present invention, the elastic member 70 may elastically deform by being pressed by the second end surface 382*d* of the outer wheel 382 and a wall 211*c* of the groove 211*b* such that the elastic member 70 urges the outer wheel 382 from the second end surface 382*d* side toward the first end surface 382*c* side.

When the load externally applied to the pedal crank shaft 22 is smaller than the force with which the elastic member 70 pushes the outer wheel 382, the pedal crank shaft 22 does not move along the thrust direction. As a result, rattling of the pedal crank shaft 22 along the thrust direction is significantly reduced or prevented.

In a preferred embodiment of the present invention, in the housing 21, the pedal crank shaft 22 may be able to move along the thrust direction by a predetermined distance D1, and a length D2 over which the elastic member 70 fitted in the groove 211*b* is able to elastically deform along the thrust direction may be longer than the distance D1.

When a load externally applied to the pedal crank shaft 22 along the thrust direction concentrate on the wall 211*c* of the groove 211*b*, the burden on the wall 211*c* increases. In a preferred embodiment of the present invention, when the load applied to the pedal crank shaft 22 becomes greater than the compression that the elastic member 70 applies to the first bearing 38L, the pedal crank shaft 22 moves along the thrust direction. When the pedal crank shaft 22 moves, the outer wheel 385 of the second bearing 38R abuts with the second abutting portion 212*a* of the second case 212. As a result, a portion of the external load also acts on the second abutting portion 212*a* of the second case 212. Because the load is received also by portions other than the wall 211*c* of the groove 211*b*, even if a large load happens to act, the load is dispersed such that the burden on the wall 211*c* of the groove 211*b* is reduced.

In the housing 21, the pedal crank shaft 22 is able to move along the thrust direction by the predetermined distance D1. The length D2 over which the elastic member 70 is able to elastically deform along the thrust direction is longer than the distance D1. In a state in which the pedal crank shaft 22 has moved by this largest distance D1, the elastic member 70 is still able to further elastically deform. As a result, the outer wheel 385 of the second bearing 38R abuts with the second abutting portion 212a of the second case 212 thus allowing a portion of the external load to be applied to the second abutting portion 212a.

In a preferred embodiment of the present invention, the inner wheel 381 of the first bearing 38L may be press-fitted onto the pedal crank shaft 22.

Because the movement of the first bearing 38L along the thrust direction is restricted, movement of the pedal crank shaft 22 along the thrust direction is restricted.

In a preferred embodiment of the present invention, the elastic force that the elastic member 70 applies to the outer wheel 382 of the first bearing 38L while undergoing an elastic deformation by a length over which elastic deformation is possible may be smaller than a force which causes the inner wheel 381 to be disengaged from the pedal crank shaft 22.

As a result, the inner wheel 381 of the first bearing 38L is prevented from becoming disengaged from the pedal crank shaft 22.

In a preferred embodiment of the present invention, the elastic member 70 may be a wave spring.

Because the movement of the first bearing 38L is restricted by the wave spring, rattling of the pedal crank shaft 22 along the thrust direction is significantly reduced or prevented.

In a preferred embodiment of the present invention, the wave spring may have a C-ring shape or a substantially C-ring shape.

As a result, the wave spring is restrained from expanding toward the outer periphery when the wave spring undergoes elastic deformation. Moreover, when assembling the drive unit 20, it is easier to place the wave spring in a desired position. For example, the wave spring is able to glide over the wall 211c of the groove 211b so as to be easily placed in the groove 211b.

In a preferred embodiment of the present invention, the groove 211b may have a ring shape to accommodate an outer periphery of the wave spring.

This allows the wave spring to be located at a desired position. An interspace needed for the elastic deformation of the wave spring is also provided.

In a preferred embodiment of the present invention, the outer wheel 382 of the first bearing 38L may be able to slide against the housing 21.

Because the first bearing 38L is able to slide, the wave spring elastically deforms in accordance with the load.

In a preferred embodiment of the present invention, a protrusion 22a extending in a radial direction may be provided on the pedal crank shaft 22; and the inner wheel 381 of the first bearing 38L may have an inner peripheral surface 381a, an outer peripheral surface 381b, and a third end surface 381c and a fourth end surface 381d by which the inner peripheral surface 381a and the outer peripheral surface 381b of the inner wheel 381 are connected to each other; the fourth end surface 381d may be located more inward than the third end surface 381c along the right-left direction of the electrically assisted bicycle 10; and the protrusion 22a of the pedal crank shaft 22 may abut with the fourth end surface 381d of the inner wheel.

Because the protrusion 22a of the pedal crank shaft 22 abuts with the fourth end surface 381d, movement of the pedal crank shaft 22 from the fourth end surface 381d side toward the third end surface 381c side is significantly reduced or prevented. As a result, rattling of the pedal crank shaft 22 along the thrust direction is significantly reduced or prevented.

An electrically assisted bicycle 10 according to preferred embodiments of the present invention includes a drive unit 20 according to any of the above.

As a result, an electrically assisted bicycle 10 is provided in which rattling of the pedal crank shaft 22 along the thrust direction is significantly reduced or prevented.

Preferred embodiments of the present invention are particularly useful in the fields of drive units to be incorporated in electrically assisted bicycles and electrically assisted bicycles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit mountable to a body frame of an electrically assisted bicycle to generate a driving power which is transmitted to a wheel of the electrically assisted bicycle, the drive unit comprising:
a housing;
an electric motor fixed to the housing;
a pedal crank shaft extending through the housing along a right-left direction of the electrically assisted bicycle; and
a pair of bearings each including an inner wheel and an outer wheel, the pedal crank shaft being supported by the pair of bearings so as to be able to rotate within the housing; wherein
the pair of bearings include a first bearing located at one side of the pedal crank shaft along a thrust direction and a second bearing located at another side of the pedal crank shaft along the thrust direction, the thrust direction corresponding to an axial direction of the pedal crank shaft;
the first bearing is positioned so as not to move relative to the pedal crank shaft along the thrust direction;
the drive unit further includes a movement restrictor to restrict movement of the first bearing relative to the housing along the thrust direction;
the outer wheel of the first bearing includes an inner peripheral surface, an outer peripheral surface, and a first end surface and a second end surface that connect the inner peripheral surface and the outer peripheral surface, the first end surface being located farther outward than the second end surface along the right-left direction of the electrically assisted bicycle;
the housing includes a first abutting portion to abut with the first end surface of the outer wheel of the first bearing, and a groove that is located farther inward than the first abutting portion along the right-left direction;
the movement restrictor includes the first abutting portion, the groove of the housing, and an elastic member fitted in the groove;
the pedal crank shaft is able to move in the housing along the thrust direction by a predetermined distance;
an interspace is provided between the second bearing and a second abutting portion of the housing in the thrust direction and defines a distance over which the pedal crank shaft is able to move along the thrust direction; and
a length over which the elastic member is able to deform along the thrust direction is longer than the predetermined distance such that, when the pedal crank shaft moves the predetermined distance, the elastic member is able to deform to allow the second bearing to contact the second abutting portion of the housing.

2. The drive unit of claim 1, wherein the elastic member is able to elastically deform between the second end surface of the outer wheel and a wall of the groove so as to urge the outer wheel from a side of the second end surface toward a side of the first end surface.

3. The drive unit of claim 1, wherein the inner wheel of the first bearing is press-fitted onto the pedal crank shaft.

4. The drive unit of claim 1, wherein an elastic force that the elastic member applies to the outer wheel of the first bearing due to elastic deformation is smaller than a force that causes the inner wheel to be disengaged from the pedal crank shaft.

5. The drive unit of claim 1, wherein the elastic member includes a wave spring.

6. The drive unit of claim 5, wherein the wave spring is C-ring shaped or substantially C-ring shaped.

7. The drive unit of claim 5, wherein the groove has a ring shape to accommodate an outer periphery of the wave spring.

8. The drive unit of claim 1, wherein the outer wheel of the first bearing is able to slide against the housing.

9. The drive unit of claim 1, wherein a protrusion extending in a radial direction is provided on the pedal crank shaft;
the inner wheel of the first bearing includes an inner peripheral surface, an outer peripheral surface, and a third end surface and a fourth end surface that connect the inner peripheral surface and the outer peripheral surface;
the fourth end surface is located farther inward than the third end surface along the right-left direction of the electrically assisted bicycle; and
the protrusion of the pedal crank shaft abuts the fourth end surface of the inner wheel.

10. An electrically assisted bicycle comprising:
the drive unit of claim 1.

* * * * *